(12) United States Patent
Huber

(10) Patent No.: US 6,470,678 B1
(45) Date of Patent: Oct. 29, 2002

(54) HYDRAULIC OPERATING ARRANGEMENT

(75) Inventor: Gerhard Huber, Frankenhofen (DE)

(73) Assignee: Hoerbiger Hydraulik GmbH, Schongau (DE)

( * ) Notice: Subject to any disclaimer, the term of this patent is extended or adjusted under 35 U.S.C. 154(b) by 48 days.

(21) Appl. No.: 09/690,453

(22) Filed: Oct. 18, 2000

(30) Foreign Application Priority Data

Oct. 18, 1999 (AT) ............................................. 1751/99

(51) Int. Cl.⁷ ............................................. F16D 31/02
(52) U.S. Cl. ............................................. 60/476; 91/420
(58) Field of Search ........................ 60/473, 476, 468; 91/420

(56) References Cited

U.S. PATENT DOCUMENTS 6,067,021 A * 5/2000 Huber ........................ 340/614

FOREIGN PATENT DOCUMENTS

| AT | 405749 | 11/1999 |
| DE | 4334843 | 4/1995 |
| SU | 1710808 | 2/1992 |

\* cited by examiner

*Primary Examiner*—Edward K. Look
*Assistant Examiner*—Michael Leslie
(74) *Attorney, Agent, or Firm*—Dykema Gossett PLLC

(57) ABSTRACT

In an hydraulic operating arrangement the working chambers (3, 4) of a double-acting working cylinder (1) are connected respectively by way of one reciprocally unlockable check valve (8, 9) with respectively one side of a reversible pressure medium source (11). The respective working chamber (3, 4) under pressure is connected with a joint, controllable proportional pressure regulating valve (15) for pressure control. On its exit side the proportional pressure regulating valve is connected with the pressure medium lines (6, 7) by way of respectively one check valve (18, 19) that opens in the direction of the pressure medium lines (6, 7), in particular between the corresponding unlockable check valves (8, 9) and the respectively belonging working chamber (3, 4) of the working cylinder (1). This way the system pressure is easily controlled by way of the proportional pressure regulating valve, and the pressure medium that is directed away is returned from the exit side of the proportional pressure regulating valve (15) directly to the pressure medium cycle and to the aspirating side of the working cylinder, thus making a simple apparatus and safe operation possible.

6 Claims, 2 Drawing Sheets

HYDRAULIC OPERATING ARRANGEMENT

BACKGROUND OF THE INVENTION

1. Field of the Invention

The invention relates to an hydraulic operating arrangement, in particular for lids, doors, covers and the such on automotive vehicles, having at least one double-acting working cylinder whose working chambers are connected respectively by way of one reciprocally unlockable check valve with one side respectively of a reversible pressure medium source. The respective working chamber under pressure is connected with a proportional pressure-regulating valve for pressure control.

2. The Prior Art

In an apparatus of the kind referred to above, known for example from AT 405 749 B, the working chamber-of the working cylinder that is respectively under pressure is connected to the entry side of the proportional pressure regulating valve by way of an automatically switching reversing valve. On the basis of a system pressure curve, determined or established either empirically or in. another suitable manner, the proportional pressure regulating valve can be selected in such a way that the system pressure respectively lies only barely above the pressure that is required for the current movement phase. This delivers a large variety of advantages for operating arrangements of this type.

It is the object of this invention to improve an operating arrangement of the type described above in terms of further simplifying the apparatus's constructive design.

SUMMARY OF THE INVENTION

This objective is achieved with an operating arrangement of the type referred to at the outset in such a way that the proportional pressure regulating valve is connected at its exit side with the pressure medium lines by way of a check valve which respectively opens in the direction of these pressure medium lines, in particular between the reciprocally unlockable check valves and the respectively associated working chamber of the working cylinder. Consequently, contrary to the described operating arrangement that is known in the art, the hydraulic medium which is directed away at the exit side of the proportional pressure regulating valve is returned directly into the pressure medium cycle and to the respective aspirating working chamber. This is why it is possible for the process to realize various advantages and improvements. Thus, with the so-called synchronism cylinder, which provides that during each movement phase the expelled hydraulic volume on the one side is equal to the hydraulic volume that is aspirated in on the other side, it is possible to work essentially without the need to compensate from the tank for lost volume. This allows reducing the size of the operating arrangement as well as the amount of the required drive power because the hydraulic volume that is expelled on the one side can directly be returned on the other side via the control action of the proportional pressure regulating valve. In most practical applications, however, a shuttle valve or something similar will be envisioned parallel to the working cylinder on the side of the tank in order to be able to quickly remove, for example, air bubbles from the hydraulic medium and to be able to suck in fresh hydraulic medium.

With the measure that has already been described in AT 405 749 B and which provides that the proportional pressure regulating valve be selected which controllably limits the system pressure taking into consideration the respective movement process of the element that is to be actuated, it is easy to effect, for example, a gentle movement take-up or correspondingly a gentle movement deceleration of the element that is to be actuated. With the normal hydraulic actuation it is possible, after the pump has stopped, to control the proportional pressure regulating valve in such a way that a holding pressure is in effect in both working chambers of the working cylinder ensuring a secure hold of the element that is to be actuated. This holding pressure can be adjusted for the respective application and can, naturally, be different for various movement positions of the element that is to be actuated.

Upon actuating the element manually, the volume flow that is to be expelled flows from the one side of the working cylinder via the proportional pressure-regulating valve and the previously mentioned check valve into the opposite, re-aspirating working chamber, which can be safely filled with the fluid while at the same time avoiding the possibility of air cushions forming in the pressure medium—thus, the element that is to be actuated is always hydraulically loaded, securely and solidly. The defined pressure acting on the proportional pressure regulating valve, e.g., defined by its control or through a corresponding initial tension, must be overcome first if the actuation is manual (refer to above "holding pressure"). After over-pressuring of this holding pressure has occurred, it is possible to determine, for example by way of the control of the proportional pressure regulating valve or using a practice that will be described below, that a manual movement of the working cylinder has been initiated. This means that the proportional pressure-regulating valve can now be selected once again in such a way that little or no pressure drops. This is why the initiated manual actuation is possible without additional counteracting force worth mentioning. After the manual movement is complete (once again, this can be determined in various ways), the proportional pressure regulating valve can again be selected with the previous holding pressure or with another holding pressure.

If the element that is to be actuated by the working cylinder is to be opened quickly by hand, it is possible to additionally influence the control of the proportional pressure regulating valve directly for example by way of a switch, in particular in such a way that the two working chambers of the working cylinder become connected virtually without resistance in the manner described above. This in turn allows for the quick and easy manual opening of the element without any counteracting pressure that is worth mentioning. To complete this adjustment possibility the proportional pressure regulating valve can be switched back to holding pressure; and this can also take place according to a corresponding process allowing the easy realization of a gentle deceleration of the element that is to be actuated.

According to a particularly preferred embodiment of the invention it is envisioned that, in conjunction with the proportional pressure regulating valve, a preloaded check valve is placed in the connection between the two working chambers of the working cylinder, which opens respectively from the pressure medium line toward the entry of the proportional pressure regulating valve. This allows a simple and functionally safe connection in terms of construction of the respective working chamber under pressure with the proportional pressure regulating valve, avoiding the separate reversing valve that was referred to at the outset in the context of the state of the art as envisioned for this purpose.

According to another preferred embodiment of the invention the pressure level of the two working chambers can be monitored using at least one pressure sensor whose measured signal, by way of a hooked up control device, is used for controlling the proportional pressure valve. By way of this working chamber side pressure sensor, it is possible to achieve very easily that the actual system pressure be considered, including all of the information contained therein regarding the movement process, any obstacles, etc. For example, the presence of an obstacle in the actuating path can be detected by way of the corresponding pressure pulse in the system pressure and, e.g., the hydraulic can be switched off. On the other hand, by immediately opening the proportional pressure-regulating valve a cycle without pressure could occur. In addition, it would be easily possible for an operator who happened to be, e.g., in the adjusting path of the operating arrangement, to push the working cylinder back again and to reopen the operating path. This pressure sensor can also be used for detecting the manual operation of the working cylinder as referred to previously. Exceeding a certain pressure threshold, for example, when the pump is inactive, is interpreted as an indicator for the desire of a manual actuation, and subsequently the proportional pressure-regulating valve could be controlled accordingly for it to open. Also, it is possible to use such a monitor to correspondingly coordinate different points of the actuation movement, or of the further actuation process or of the controlling action of the proportional pressure-regulating valve.

In an advantageous realization of the invention the pressure sensor is arranged in or on the common supply line to the proportional pressure regulating valve, thus allowing the use of a single pressure sensor for both working chambers of the working cylinder—aside from this, also possible would be, of course, an apparatus consisting of two separate pressure sensors for monitoring the two sides of the working cylinder. However, as referred to above, the holding pressure could also be realized independently of a separate pressure sensor by way of (e.g. mechanical) pre-loading of the proportional pressure regulating valve.

According to a farther advantageous realization of the invention a distance sensor is arranged on the working cylinder. And the output measured by the distance sensor is forwarded to the control device. Distance sensors are often integrated in various ways in actuation apparatuses of this kind anyway, for example, for establishing if certain positions were reached, final positions and the like. With this distance sensor, while the pump is inactive, it can be determined very easily if, through a corresponding displacement of the piston of the working cylinder, a manual operation has been initiated. Following this the control of the proportional pressure regulating valve can be influenced correspondingly according to the way described above.

According to a particularly preferred realization of the invention it is envisioned that the proportional pressure regulating valve is closed when deenergized, thus allowing a simple apparatus and/or a simple hydraulic cycle. Often this will be preferred for safety reasons due to the blocking of the hydraulic actuation which occurs with this apparatus (if necessary, only up to the "holding pressure").

The invention will be described in more detail in accordance with the schematically illustrated embodiments in the drawings.

DETAILED DESCRIPTION OF THE PREFERRED EMBODIMENTS

Figure 1:
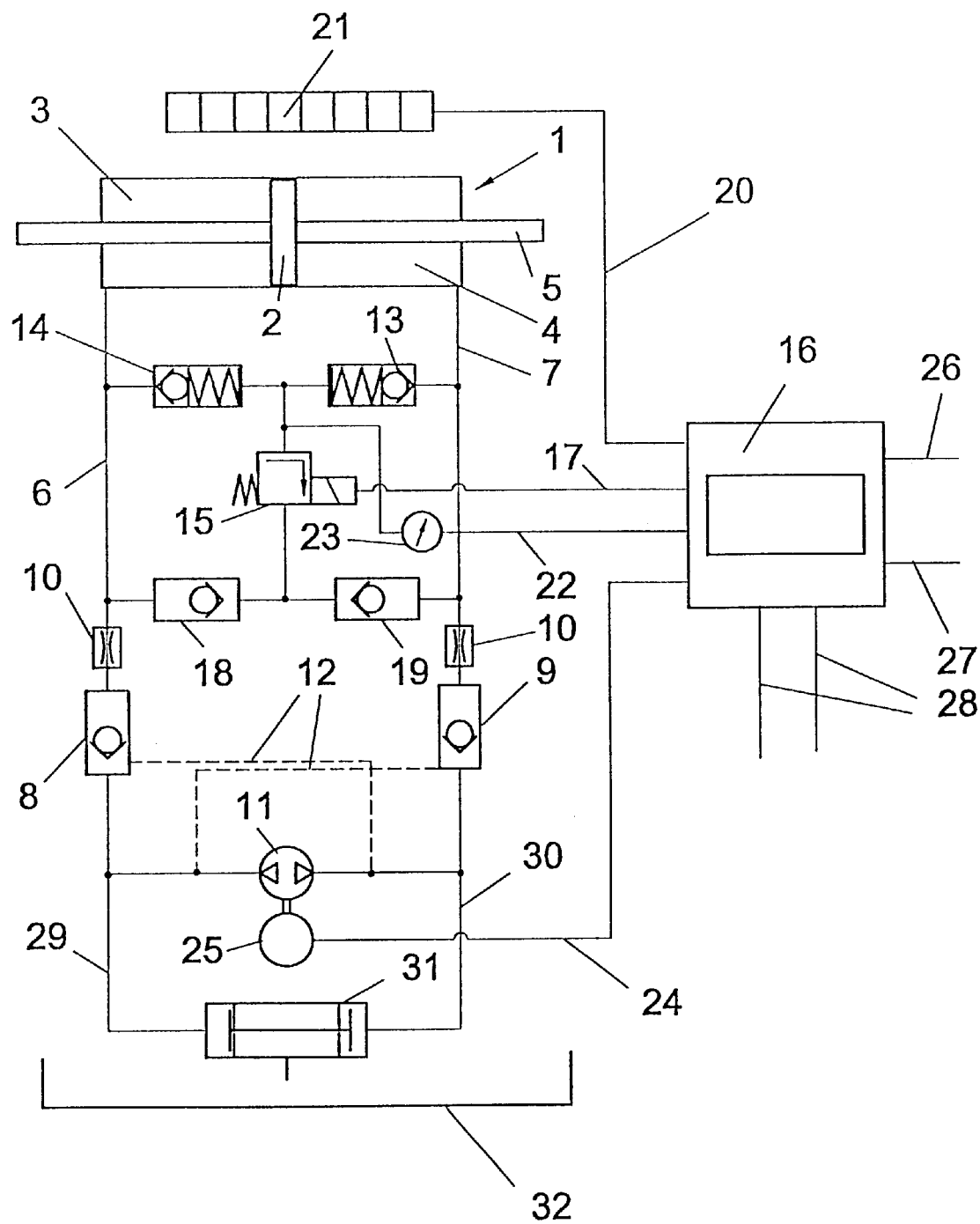
FIG. 1 shows the schematic circuit diagram of a hydraulic operating arrangement in accordance with the present invention featuring a synchronism working cylinder.

The working cylinder 1 according to FIG. 1 has the working chambers 3, 4 on both sides of the piston 2. Because the piston rod 5 extends to the outside on both sides of the cylinder, the working chambers are realized in such a way that if an axial adjustment of the piston 2 is effected, the volume of hydraulic medium that is expelled on the one side is equal to the volume of hydraulic medium that is aspirated on the other side. The two working chambers 3, 4 are connected respectively each to one side each of a pump 11 by way of the pressure medium lines 6, 7 and the check valves 8, 9, which are preceded in the present context by throttles 10. Via the lines 12 the check valves 8, 9 are reciprocally unlockable. Therefore, during normal hydraulic operation of the operating arrangement, easy circulating of the hydraulic medium, utilizing the pump 11, from the working chamber 3, 4 that is becoming smaller to the working chamber 3, 4 that is becoming larger can take place.

By way of the return tension valves 13, 14, which are per definition pre-loaded here, the respective working chamber 3, 4 under pressure is connected with a controllable proportional pressure-regulating valve 15 that can be controlled from a control device 16 by way of a line 17, in particular on the basis of for example empirically established changes of the system pressure. On its exit side this proportional pressure regulating valve 15 is connected with the pressure medium lines 6, 7, respectively by way of a check valve 18, 19 which opens in the direction of the pressure medium lines 6, 7, in particular between the unlockable check valves 8, 9 and the respectively belonging working chamber 3, 4 of the working cylinder 1. Consequently, the flow directed toward the proportional pressure regulating valve 15, which has the purpose of controlling the pressure control inside the system, always comes from one direction only. Also, the proportional pressure regulating valve 15 ensures that, for each movement phase of the operating arrangement, the system pressure is only slightly above what is necessary, which results in a minimal power surplus or that only little unnecessary drive energy is required. If an obstacle emerges in the operating path, the force that is exercised in relation to the obstacle is correspondingly low, thus precluding for example operator injuries. If an element that is attached to the piston rod 5, not shown here, is actuated by hand, upon applying a higher pressure than the pre-loaded check valve 13 or 14 and a higher pressure in comparison to the holding pressure that is adjusted at the proportional pressure-regulating valve, it is possible to push from one working chamber 3, 4 to the respectively other working chamber.

In addition to being attached to the proportional pressure-regulating valve 15 by way of the line 17, the control device 16 is also connected with a distance sensor 21 on the working cylinder 1 by way of a line 20, with a pressure sensor 23 integrated on the entry side of the proportional pressure-regulating valve 15 via a line 22 and with the drive motor of the pump 11 via the line 24. Moreover, the signal lines 26, 27 are indicated on the right side of the control device 16 intended for initiating controlled opening and/or closing. The lines 28 on the bottom side of the control device 16 supply energy.

Parallel to the working cylinder 1, by way of the lines 29, 30, the pump 11 is also attached to a shuttle valve 31 which communicates with the tank 32 in a way commonly known in the art. In the case that is illustrated in FIG. 1 this shuttle valve 31 is only necessary to simplify the removal of any gas bubbles that might develop inside the system. It is not needed for equalizing the working volumes which are symmetrical anyway according to the previous description.

Upon initiating a manual movement of the piston 2 of the working cylinder 1, in the depiction according to FIG. 1 for example to the right side, hydraulic medium is expelled from the working chamber 4 and reaches, by way of the preloaded check valve 13, the proportional pressure-regulating valve 15, which is closed here when deenergized. As soon as the pressure established by the pressure sensor 23 exceeds an adjustable threshold (holding pressure), the proportional pressure-regulating valve 15 is opened by way of the control device 16 and the line 17 using a freely selectable time line, thus allowing a virtually uninhibited pushover action into the working chamber 3 via the check valve 18 and the line 6. Instead of the separate pressure sensor it is also possible to pre-load the proportional pressure-regulating valve 15, e.g., mechanically, and it would therefore be closed until the holding pressure is reached. The determination of the manual movement of the piston 2 can be effected either by way of the pressure sensor 23 or by way of the distance sensor 21. As soon as this manually implemented adjustment movement is completed, the proportional pressure-regulating valve 15 is closed again. This results in the piston 2 being held safely and hydraulically, up to holding pressure. Before initiating an intended manual adjustment it is also possible, however, to actively clear the proportional pressure-regulating valve 15 using the line 17. This will also make a virtually uninhibited pushover action of the hydraulic medium possible.

Figure 2:
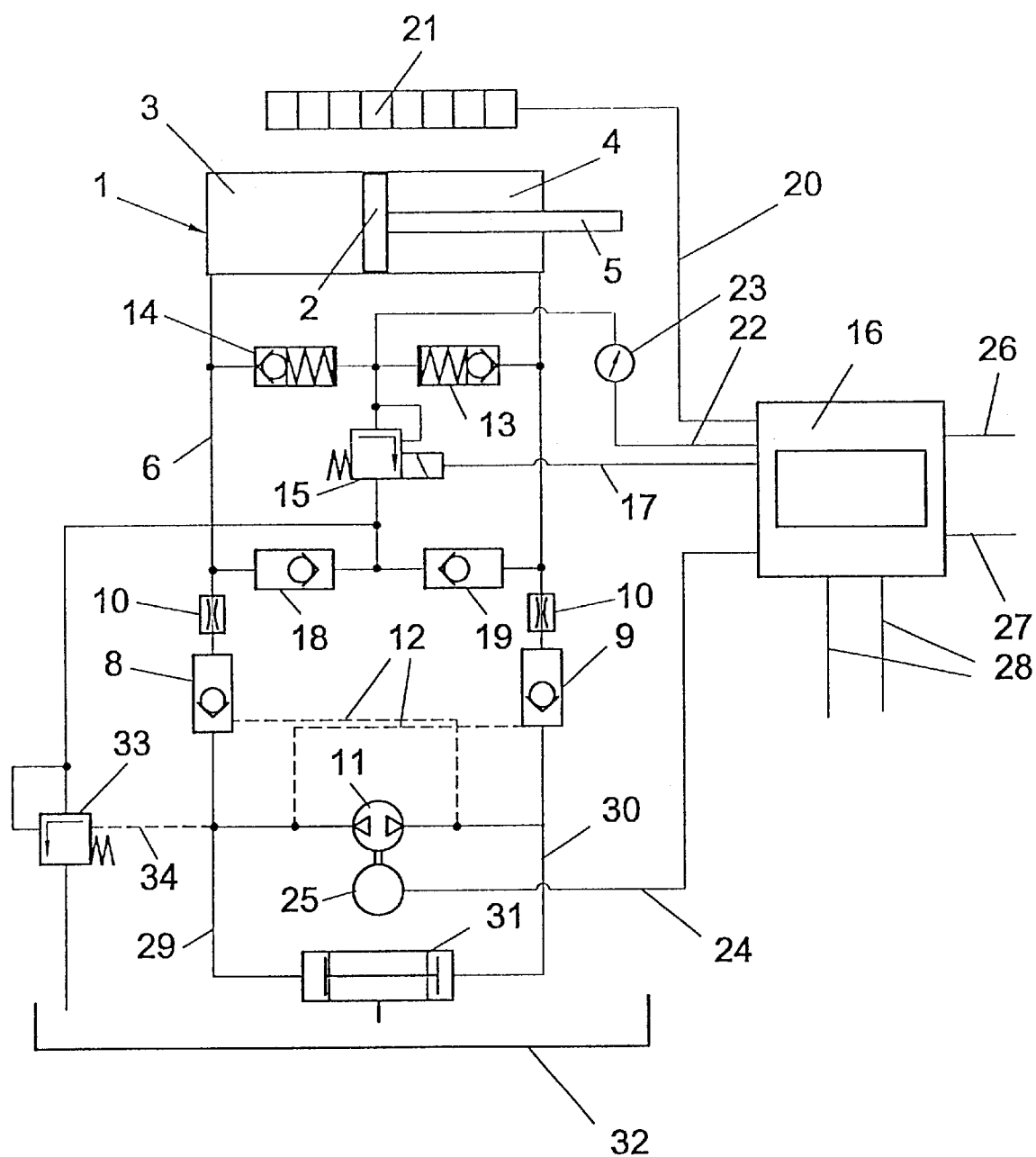
FIG. 2 shows a corresponding example but with the difference that a working cylinder has a piston rod that extends to the outside of the working chamber only on one side, which is why the working cylinder exhibits different working volumes on the two piston sides.

The arrangement in accordance with FIG. 2 differs from the depiction according to FIG. 1 only to the extent that here a piston rod 5 extends to the outside of the working cylinder 1 exclusively on one side—resulting in different volume conditions and/or volume changes of the working chambers 3, 4—which is why a pressure control valve 33 is integrated on the exit side of the proportional pressure regulating valve 15 for dealing with the necessity that arises in this context of directing any additionally occurring volume to the tank 32 or to return it from there to the aspirating working chamber. The pressure control valve leads to the tank 32 and is connected with the pump by way of a line 34.

During normal hydraulic operation, when extending the working cylinder 1 (the piston rod 5 in the illustration moves to the right), the pressure control valve 33 is actively controlled to close by way of the pressure of the hydraulic medium that is fed into the working chamber 3 by way of the line 34. If the working cylinder 1 is operated manually, virtually no pressure comes via the line 34. Therefore, the pressure control valve 33 reacts in the customary way every time if the back-and-forth movement of the piston in the working chambers 3 and 4, which differ in terms of volume, requires it. Also to be noted at this point is the fact that the branch-off to the pressure control valve 33 that is located after the proportional pressure regulating valve 15, which is shown, can also be located and immediately integrated at a corresponding location in the line 6 leading to the working chamber 3.

Aspirating from the tank 32 (this is necessary because of the described different working volumes on the two sides of the piston 2) following any adjustment of the working cylinder 1 in accordance with FIG. 2 occurs either by way of the unlockable check valve 8, the line 29 and the shuttle valve 31 or by way of the parallel apparatus of a suitable aspiration check valve that is known in the art.

What is claimed is:

1. A hydraulic apparatus for moving a part relative to a vehicle which comprises:

a double-acting working cylinder defining first and second working chambers therein, a pressure medium source having first and second sides, a first line for delivering pressure medium from said first side of said pressure medium source to said first working chamber, said first line including a first unlockable check valve, a second line for delivering pressure medium from said second side of said pressure medium source to said second working chamber, said second line including a second unlockable check valve, a solenoid controllable proportional pressure regulating valve having an input side and an output side, a third line for delivering pressure medium from said first working chamber to said input side of said pressure regulating valve, a fourth line for delivering pressure medium from said second working chamber to said input side of said pressure regulating valve, a fifth line for delivering pressure medium from said output side of said pressure regulating valve to said first line between said first check valve and said first working chamber, said fifth line including a third check valve, and a sixth line for delivering pressure medium from said output side of said pressure regulating valve to said second line between said second check valve and said second working chamber, said sixth line including a fourth check valve.

2. A hydraulic apparatus according to claim 1, including a first preloaded check valve in said third line and a second preloaded check valve in said fourth line.

3. A hydraulic apparatus according to claim 1, including pressure sensor for monitoring a pressure in said first and second working chambers, and a control device for controlling operation of said proportional pressure regulating valve based on measurements from said pressure sensor.

4. A hydraulic apparatus according to claim 3, wherein said third and fourth lines joint with a common line leading to said pressure regulating valve and wherein said pressure sensor is connected to said common line.

5. A hydraulic apparatus according to claim 4, including a distance sensor associated with said working cylinder, signals from said distance sensor being fed to said control device.

6. A hydraulic apparatus according to claim 1, wherein said first and second unlockable check valves are respectively operatively connected to output pressures of said second and first sides of said pressure medium source so as to be reciprocally unlockable.

* * * * *